(12) United States Patent  
Donohue et al.

(10) Patent No.: US 10,713,226 B1
(45) Date of Patent: *Jul. 14, 2020

(54) MANAGING DATA USING ARCHIVING

(71) Applicant: Workday, Inc., Pleasanton, CA (US)

(72) Inventors: Seamus Donohue, Walnut Creek, CA (US); Sergio Mendiola Cruz, Dublin, CA (US); Ken Pugsley, Kansas City, MO (US); John Levey, Dublin (IE); Gerald Green, San Jose, CA (US); Iacopo Pace, Dublin (IE)

(73) Assignee: Workday, Inc., Pleasanton, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/970,384

(22) Filed: Dec. 15, 2015

(51) Int. Cl.  
*G06F 16/21* (2019.01)

(52) U.S. Cl.  
CPC .................. *G06F 16/219* (2019.01)

(58) Field of Classification Search  
CPC .................. G06F 17/30309; G06F 16/219  
USPC ........................................ 707/667  
See application file for complete search history.

(56) References Cited

U.S. PATENT DOCUMENTS

| | | | | |
|---|---|---|---|---|
| 2008/0229020 A1* | 9/2008 | Plamondon | ......... | G06F 12/0813 711/122 |
| 2008/0320257 A1* | 12/2008 | Cowham | ................. | H04L 41/06 711/161 |
| 2010/0325429 A1* | 12/2010 | Saha | .................... | H04L 63/0823 713/158 |
| 2012/0166483 A1* | 6/2012 | Choudhary | ......... | G06F 16/2471 707/770 |
| 2014/0006357 A1* | 1/2014 | Davis | .................. | G06F 11/1464 707/667 |
| 2014/0137241 A1* | 5/2014 | Smith | ................. | H04L 63/1408 726/22 |
| 2014/0331139 A1* | 11/2014 | Carson | ................. | G11B 27/031 715/723 |
| 2014/0358864 A1* | 12/2014 | Hale | ..................... | G06F 3/0481 707/667 |
| 2015/0095289 A1* | 4/2015 | Prabhu | .................. | G06F 16/113 707/672 |
| 2017/0011073 A1* | 1/2017 | Deshpande | ........... | G06F 16/215 |

* cited by examiner

*Primary Examiner* — Hosain T Alam  
*Assistant Examiner* — Saba Ahmed  
(74) *Attorney, Agent, or Firm* — Van Pelt, Yi & James LLP

(57) ABSTRACT

A system for archiving includes an active memory, an archive memory, an interface, and a processor. The interface is to receive an indication to archive an object in the active memory. The object has a relation to an other object. The processor is to archive the object in the archive memory. The other object maintains the relation with the object that has been archived.

22 Claims, 20 Drawing Sheets

| Object Data Table |||||||||
|---|---|---|---|---|---|---|---|---|
| ID | Attribute Bits |||||||  Data Blob |
| DA5B | 0 | 0 | 1 | 0 | 0 | 0 | 0 | <DA5B> |
| EA79 | 0 | 0 | 0 | 1 | 1 | 1 | 0 | <EA79> |
| 0264 | 0 | 0 | 0 | 0 | 0 | 0 | 0 | <0264> |
| B402 | 0 | 1 | 0 | 0 | 0 | 0 | 0 | <B402> |
| 7DAC | 0 | 0 | 1 | 0 | 0 | 0 | 0 | <7DAC> |
| 5CC3 | 0 | 0 | 0 | 1 | 1 | 0 | 0 | <5CC3> |
| D1D1 | 0 | 0 | 0 | 0 | 0 | 0 | 0 | <D1D1> |
| FFCF | 0 | 0 | 0 | 0 | 0 | 0 | 1 | <FFCF> |

Fig. 8

MANAGING DATA USING ARCHIVING

BACKGROUND OF THE INVENTION

A computer database system stores computer information. As data is input into the database system, data structures to store the information are created. However, maintaining all data structures as operational indefinitely by the database system consumes ever an increasing amount of a valuable resource. The data uses up valuable resources resulting in a computer system that runs inefficiently. Further, for a database that includes relations between objects, removal of objects without attention to those relations can cripple the database causing it to operate inconsistently. In some cases, an application developer is relied on to properly remove unneeded data structures from operational memory. However, this is also inefficient in addition to being error prone.

BRIEF DESCRIPTION OF THE DRAWINGS

Various embodiments of the invention are disclosed in the following detailed description and the accompanying drawings.

FIG. 8 is a diagram illustrating an embodiment of an object data table.

DETAILED DESCRIPTION

Figure 1:
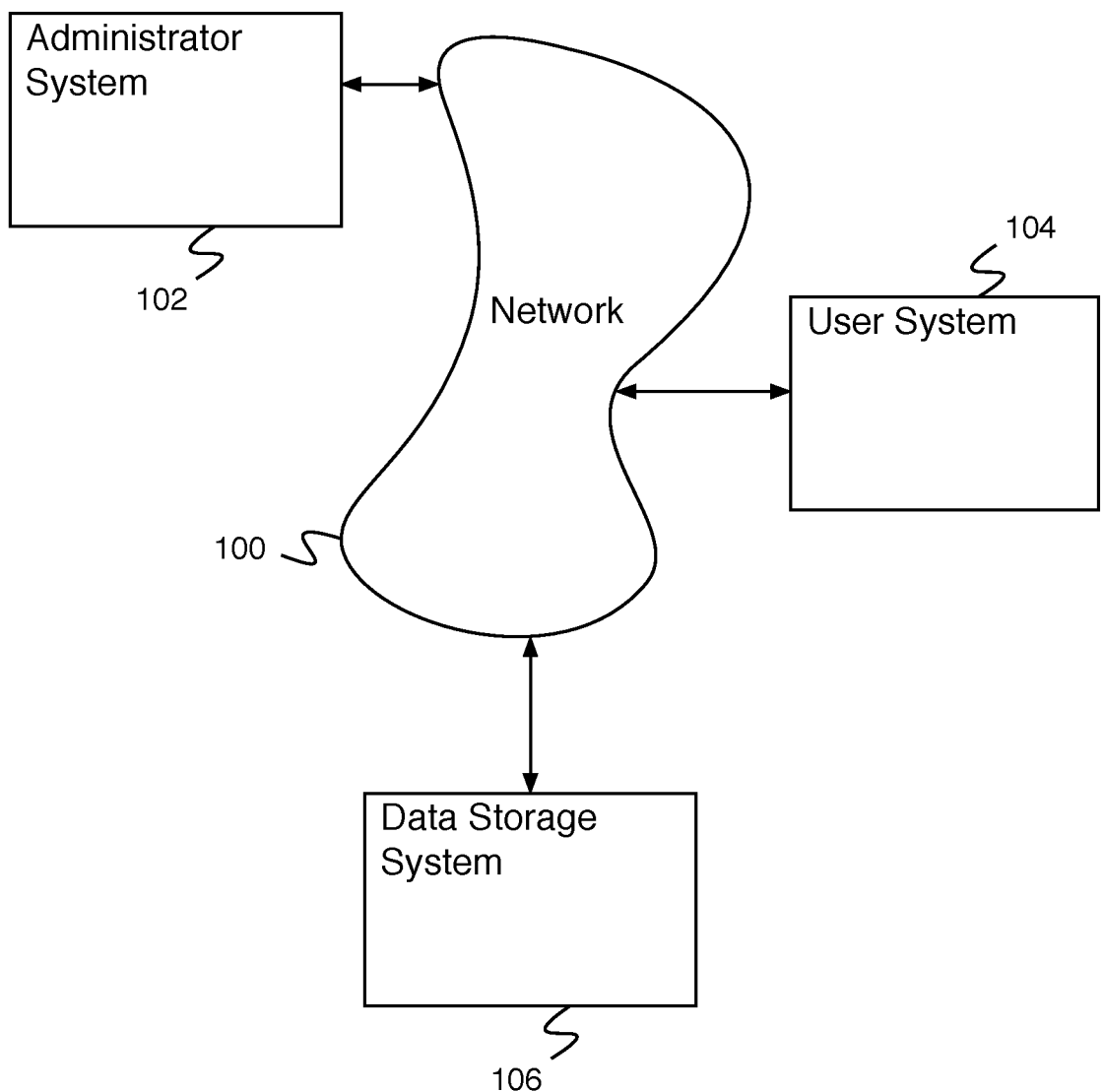
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for archiving is disclosed. In some embodiments, the system for archiving comprises an active memory; an archive memory; an interface to receive an indication to archive an object in the active memory, wherein the object has a relation to an other object; and a processor to archive the object in the archive memory, wherein the other object maintains the relation with the object that has been archived.

A system for reporting using archived data is disclosed. The system for reporting using archived data comprises an active memory; an archive memory; an interface to receive an indication to update data; and a processor to run the report, wherein the report accesses active data in the active memory and archive data in the archive memory; wherein archive data comprises former active data that has been archived; wherein archive data is accessed using a relation of an active object in the active memory with an archived object in the archive memory.

A system for updating archived data is disclosed. In some embodiments, the system for updating archived data comprises an active memory; an archive memory; an interface to receive an indication to update data; and a processor to update archive data in the archive memory; wherein archive data comprises former active data that has been archived; wherein archive data is accessed using a relation of an active object in the active memory with an archived object in the archive memory.

In some embodiments, a system for managing data using archiving comprises a set of data stored in a database. The data is stored as a set of data objects, each object comprising attributes (e.g., data values), relationships (e.g., connections to other data objects), and methods (e.g., software code used for accessing, modifying, manipulating, etc. the data). The system comprises an effective change stack associated with each data object, storing the history of the object as a set of changes that have been applied to the object over time. In some embodiments, a data object includes metadata indicating that it is archivable. A data object including archivable metadata can be archived by the system for managing data using archiving. In some embodiments, when an object is archived, it is moved from an active memory to an archive memory (e.g., copied from the active memory to the archive memory, and deleted from the active memory). In some embodiments, the active memory comprises a solid-state memory (e.g., a random access memory, e.g., a RAM) and the archive memory comprises a magnetic memory (e.g., a disk memory). In various embodiments, the active memory has a faster access time than the archive memory, the active memory has higher cost than the archive memory, the active memory has higher reliability than the archive memory, or any other appropriate property relation between the active memory and the archive memory. In some embodiments, when an object is archived, it is flagged as immutable to a user (e.g., a system user can no longer make modifications to the data as they typically would to active data). In some embodiments, archived objects are accessible in the same way as active objects (e.g., relations can be followed between active objects and archived objects). In some embodiments, following a relation from an active object to an archived object requires an archive access permission (e.g., only users or processes with permission can access archived objects). In some embodiments, a data reporting process (e.g., a data reporting process with appropriate report process archive data permissions) creates a report including data from an active object and an archived object. In some embodiments, a data updating process (e.g., a process for updating a data object structure, e.g., a process for updating data object methods, attributes, or relations with appropriate update process archive data permissions) updates data structures of an active object and of an archived object.

In some embodiments, an active database system stores data in an active memory (e.g., a running process memory, random access memory, etc.) and the data is also persisted in a persistence memory a database (e.g., disk, storage database, etc.). However, active memory is a finite resource. Data is archived by removing the data from the active memory and indicating that the data is archived in the persistence memory making the computer system more efficient. The data is stored as archive memory so that it can be accessed if necessary. Access to archived memory requires permission to access archive data. In various embodiments, permissions include one or more of the following: user access permission, process access permission, or any other appropriate permission. On starting up the system, the active memory is loaded from the data stored in the persistence memory unless it has been designated as archived.

FIG. 1 is a block diagram illustrating an embodiment of a network system. In some embodiments, the network system of FIG. 1 comprises a system for an automated archiving architecture. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and data storage system 106 communicate via network 100. In various embodiments, administrator system 102 comprises a system for an administrator to access data on data storage system 106, to create data structures on data storage system 106, to indicate removal of data structures on data storage system 106, or for any other appropriate purpose. User system 104 comprises a system for a user. In some embodiments, user system 104 comprises a system for accessing data storage system 106. Data storage system 106 comprises a system for managing an object-based database. In some embodiments, data storage system 106 comprises a system for storing data provided by a user (e.g., via user system 104 and network 100). In some embodiments, data storage system 106 comprises a system for removing data provided by a user. In some embodiments, data storage system 106 comprises a system for performing automated archiving.

Figure 2:
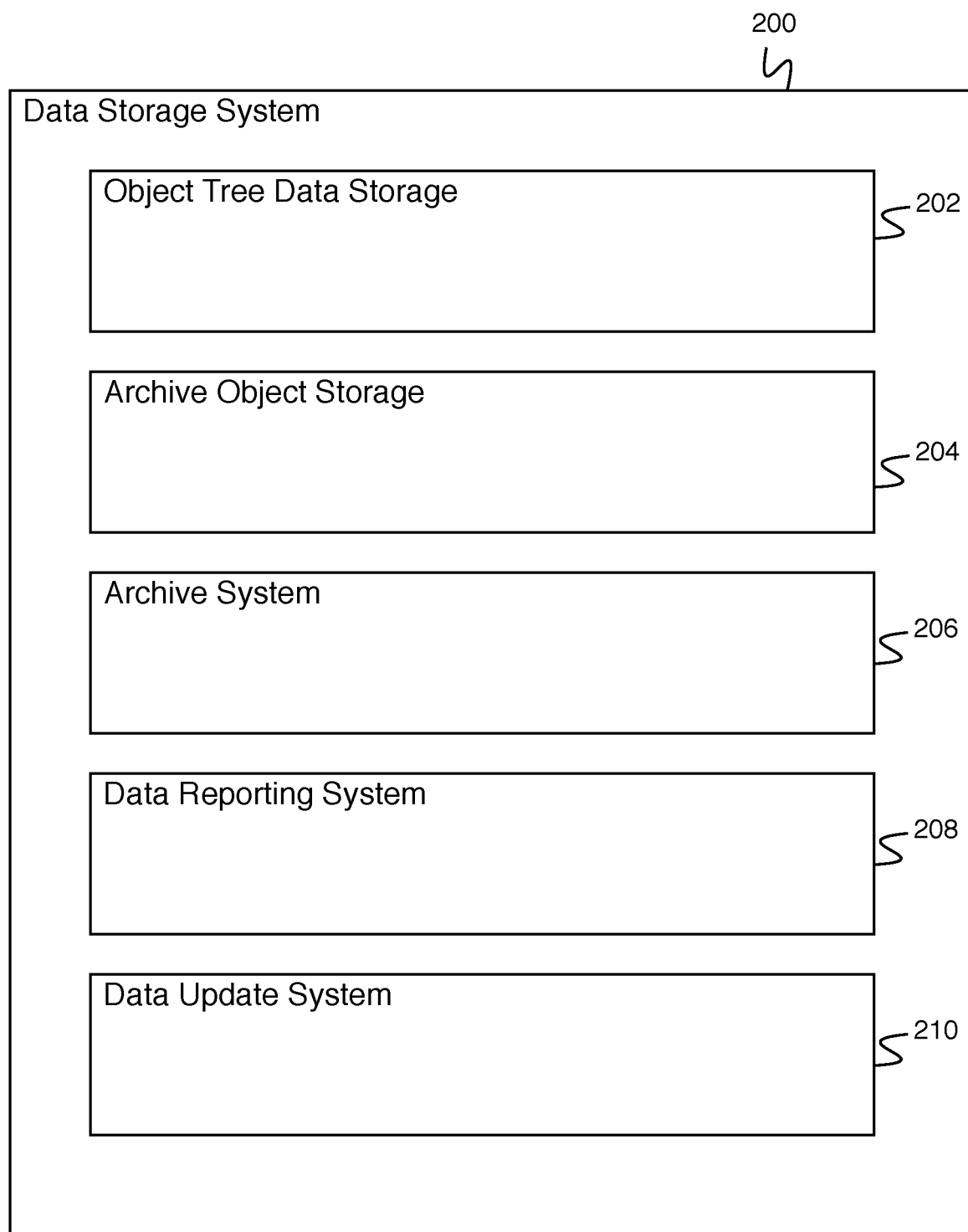
FIG. 2 is a block diagram illustrating an embodiment of a data storage system.

FIG. 2 is a block diagram illustrating an embodiment of a data storage system. In some embodiments, data storage system 200 of FIG. 2 comprises data storage system 106 of FIG. 1. In the example shown, data storage system 200 comprises a data storage system for automated archiving. Data storage system 200 comprises object tree data storage 202. In some embodiments, object tree data storage 202 comprises an object tree database (e.g., a database for storing database data structured as an object tree). In some embodiments, object tree data storage 202 comprises one or more archive member objects (e.g., objects comprising archive member metadata). In some embodiments, object tree data storage 202 comprises a semiconductor memory (e.g., a random access memory, e.g., a RAM). Data storage system 200 comprises archive object storage 204. In some embodiments, archive object storage comprises a storage for objects that have been archived. In various embodiments, archive object storage 204 comprises a storage for objects that have been archived, a temporary storage for objects that have been archived before permanent archiving, or any other appropriate archive object storage. In some embodiments, archive object storage 204 comprises a separate physical memory from object tree data storage 202. In some embodiments, archive object storage 204 comprises a magnetic memory (e.g., a hard disk). Data storage system 200 additionally comprises archive system 206. In some embodiments, archive system 206 comprises a system for identifying an object (e.g., an object stored in object tree data storage 202) for archiving. In some embodiments, archive system 206 comprises a system for indicating to archive an object. In various embodiments, archiving an object comprises marking an object as archived, moving an object to archive object storage 204, or performing any other appropriate archive function. In some embodiments, archive system 206 is implemented using a processor. Data reporting system 208 comprises a system for creating reports based on data. In various embodiments, data reporting system creates reports based on data in object tree data storage 202, in archive object storage 204, in both object tree data storage 202 and archive object storage 204, or in any other appropriate data storage. In some embodiments, data reporting system 208 follows relations from objects in object tree data storage 202 to objects in archive object storage 204. In some embodiments, data reporting system 208 follows relations from objects in archive object storage 204 to objects in object tree data storage 202. In some embodiments, data reporting system 208 is implemented using a processor. Data update system 210 comprises a data update system for updating an object data structure. In various embodiments, data update system adds, removes, or modifies attributes, methods, or relations associated with an object. In some embodiments, data update system 210 updates data objects stored in object tree data storage 202. In some embodiments, data update system 210 updates data objects stored in archive object storage 204. In some embodiments, follows relations from objects in object tree data storage 202 to objects in archive object storage 204. In some embodiments, data update system 210 follows relations from objects in archive object storage 204 to objects in object tree data storage 202. In various embodiments, the elements of data storage system 200 are implemented combined onto a single processor, each using their own processor, or combined onto multiple processors in any appropriate way. In some embodiments, a processor of data storage system 200 is coupled to a memory, where the memory is configured to provide instructions to the processor.

Figure 3:
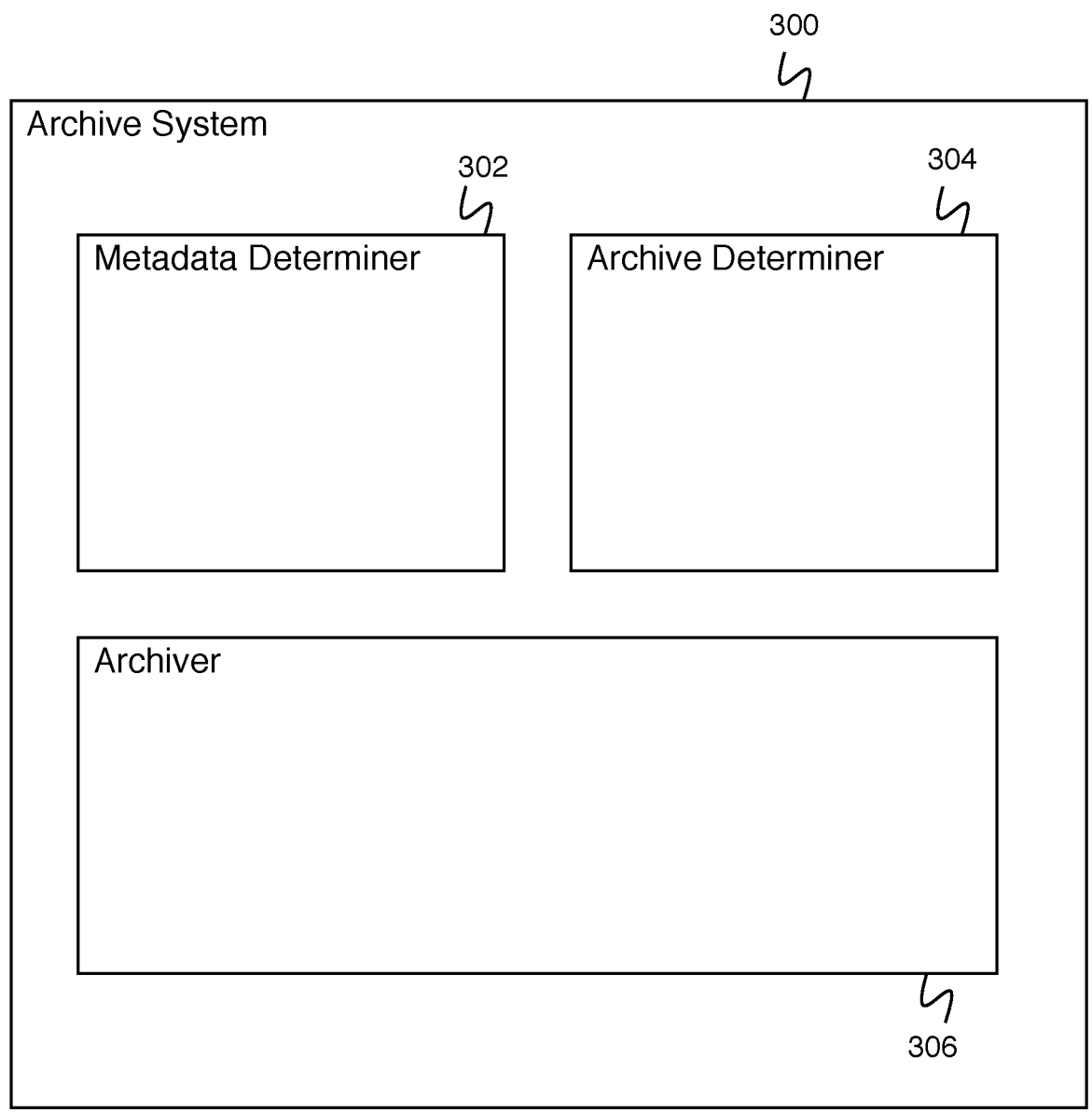
FIG. 3 is a block diagram illustrating an embodiment of an archive system.

FIG. 3 is a block diagram illustrating an embodiment of an archive system. In some embodiments, archive system 300 comprises archive system 206 of FIG. 2. In the example shown, archive system 300 comprises metadata determiner 302. In some embodiments, metadata determiner 302 comprises a metadata determiner for determining metadata associated with an object. In some embodiments, metadata determiner 302 determines whether an object comprises an archive root object (e.g., whether the object is associated with archive root metadata). In some embodiments, metadata determiner 302 determines whether an object comprises an archive member object (e.g., whether the object is associated with archive member metadata). In some embodiments, an object comprises associated metadata (e.g., the metadata is stored as part of the object, the metadata is stored in a separate object and associated with the object using a relation). In some embodiments, an object database stores object information and associated metadata. In some embodiments, archive root metadata inherits properties from an archive root class (e.g., the archive root object inherits from an archive root class). In some embodiments, archive member metadata inherits from an archive member class (e.g., the archive member object inherits from a archive member class). In some embodiments, metadata determiner 302 is implemented using a processor. Archive determiner 304 comprises an archive determiner for determining whether an object (e.g., an object associated with archive metadata) should be archived. In various embodiments, archive determiner 304 determines whether an object should be archived based at least in part on its age, its relations to other objects, its associated data, or any other appropriate information. In some embodiments, archive determiner 304 is implemented using a processor. Archive system 300 additionally comprises archiver 306. In some embodiments, archiver 306 comprises an archiver for archiving an object (e.g., an object that archive determiner 304 determines should be collected). In some embodiments, archiver 306 is implemented using a processor. In various embodiments, the elements of archive system 300 are implemented on a single processor, each on a separate processor, or combined on a plurality of processors in any other appropriate way. In some embodiments, a processor is coupled to a memory, where the memory is configured to provide the processor with instructions.

Figure 4:
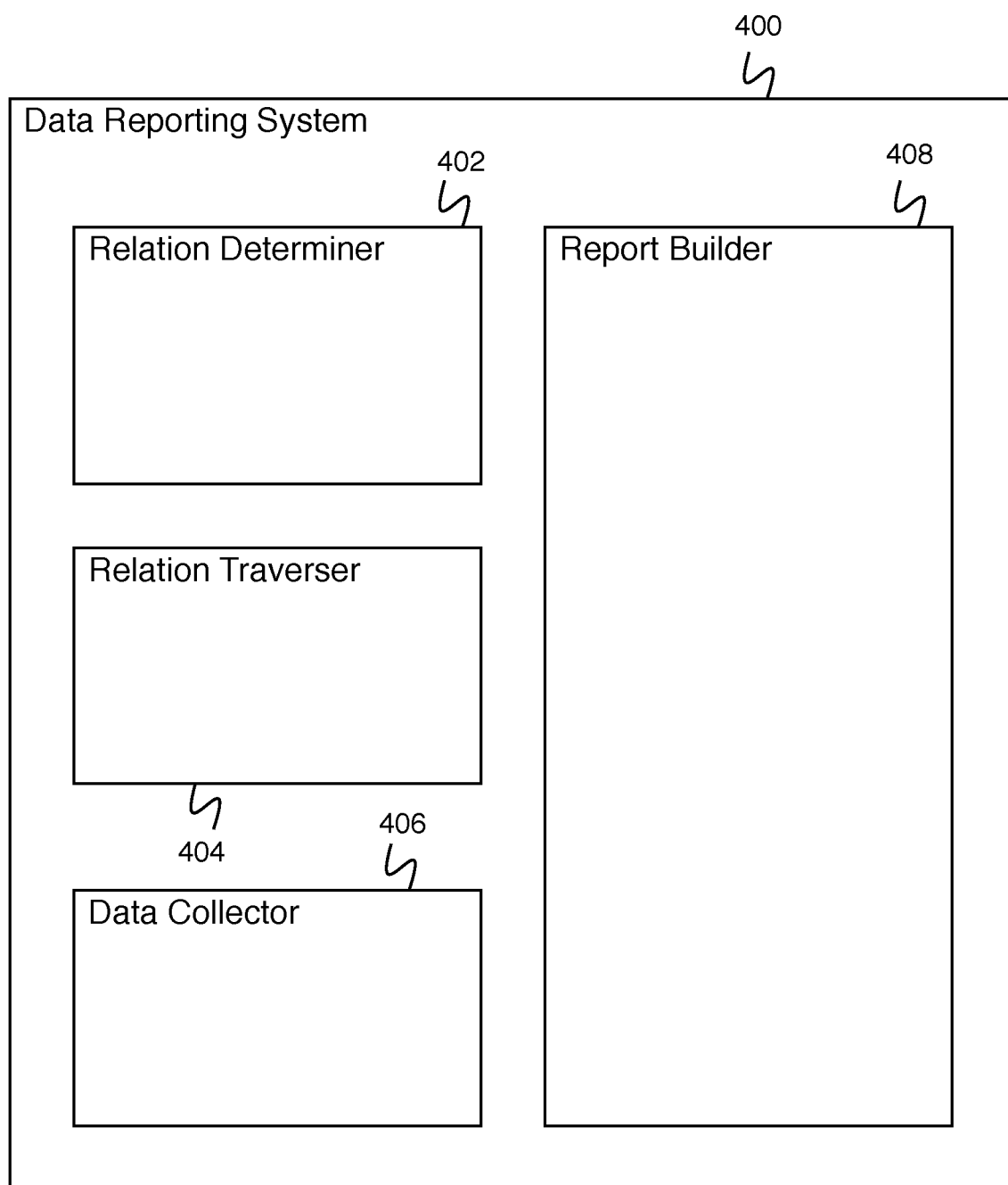
FIG. 4 is a block diagram illustrating an embodiment of a data reporting system.

FIG. 4 is a block diagram illustrating an embodiment of a data reporting system. In some embodiments, data reporting system 400 comprises data reporting system 208 of FIG. 2. In the example shown, data reporting system 400 comprises relation determiner 402. In some embodiments, relation determiner 402 comprises a relation determiner for determining a relation of an object (e.g., a relation of an object to an other object, where the relation is traversed to access the other object from the object). In some embodiments, relation determiner 402 comprises a relation determiner for determining a next object to collect data from for a report. In some embodiments, relation determiner 402 determines a relation to an object in an object tree data storage. In some embodiments, relation determiner 402 determines a relation to an object in an archive object storage. In some embodiments, relation determiner 402 is implemented using a processor. Relation traverser 404 comprises a relation traverser for traversing a relation. In some embodiments, relation traverser 404 receives a relation (e.g., a relation determined by relation determiner 402) and determines an object indicated by the relation. In some embodiments, relation traverser 404 traverses a relation by querying an object data table. In some embodiments, relation traverser 404 is implemented using a processor. Data collector 406 comprises a data collector for collecting data from an object. In some embodiments, data collector 406 collects data from one or more attribute fields of the object. In some embodiments, data collector 406 processes data that has been collected. In some embodiments, data collector 406 provides collected data and/or processed collected data to report builder 408. In some embodiments, data collector 406 is implemented using a processor. In some embodiments, report builder 408 comprises a report builder for building a report based at least in part on data (e.g., collected data or collected processed data received from data collector). In various embodiments, report builder 408 comprises a report builder for combining data, for extracting statistics, for creating graphs and/or other figures, for formatting data into a report, or for creating any other appropriate report information. In some embodiments, report builder 408 is implemented using a processor. In various embodiments, the elements of data reporting system 400 are implemented on a single processor, each on a separate processor, or combined on a plurality of processors in any other appropriate way. In some embodiments, a processor is coupled to a memory, where the memory is configured to provide the processor with instructions.

Figure 5:
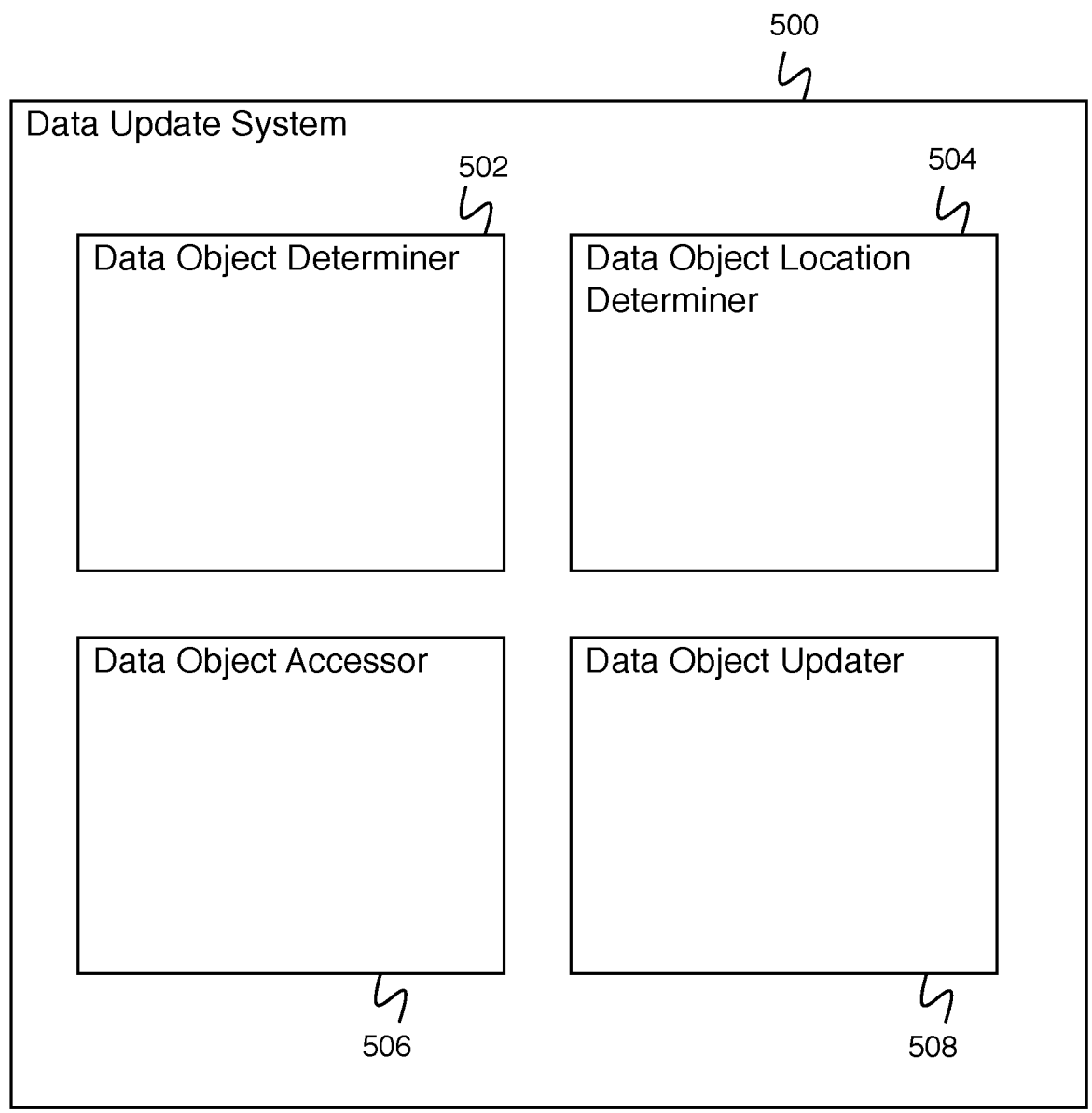
FIG. 5 is a block diagram illustrating an embodiment of a data update system.

FIG. 5 is a block diagram illustrating an embodiment of a data update system. In some embodiments, data update system 500 of FIG. 5 comprises data update system 210 of FIG. 2. In the example shown, data update system 500 comprises data object determiner 502. In some embodiments, data object determiner 502 comprises a data object determiner for determining a data object for updating. In some embodiments, data object determiner 502 comprises a data object determiner for selecting a next data object. In some embodiments, data object determiner 502 determines a data object in an object tree data storage. In some embodiments, data object determiner 502 determines a data object in an archive data storage. Data object location determiner 504 comprises a data object location determiner for determining the location of a data object. In some embodiments, data object location determiner 504 determines a data object location in an object tree data storage. In some embodiments, data object location determiner 504 determines a data object location in an archive data storage. In some embodiments, data object location determiner 504 is implemented using a processor. Data object accessor 506 comprises a data object accessor for accessing a data object. In some embodiments, data object accessor 506 accesses a data object in an object tree data storage. In some embodiments, data object accessor 506 accesses a data object in an archive data storage. In some embodiments, data object accessor 506 is implemented using a processor. Data object updater 508 comprises a data object updater for updating a data object. In some embodiments, data object updater 508 updates a data object in an object tree data storage. In some embodiments, data object updater 508 updates a data object in an archive data storage. In some embodiments, data object updater 508 is implemented using a processor. In various embodiments, the elements of data update system 500 are implemented on a single processor, each on a separate processor, or combined on a plurality of processors in any other appropriate way.

Figure 6:
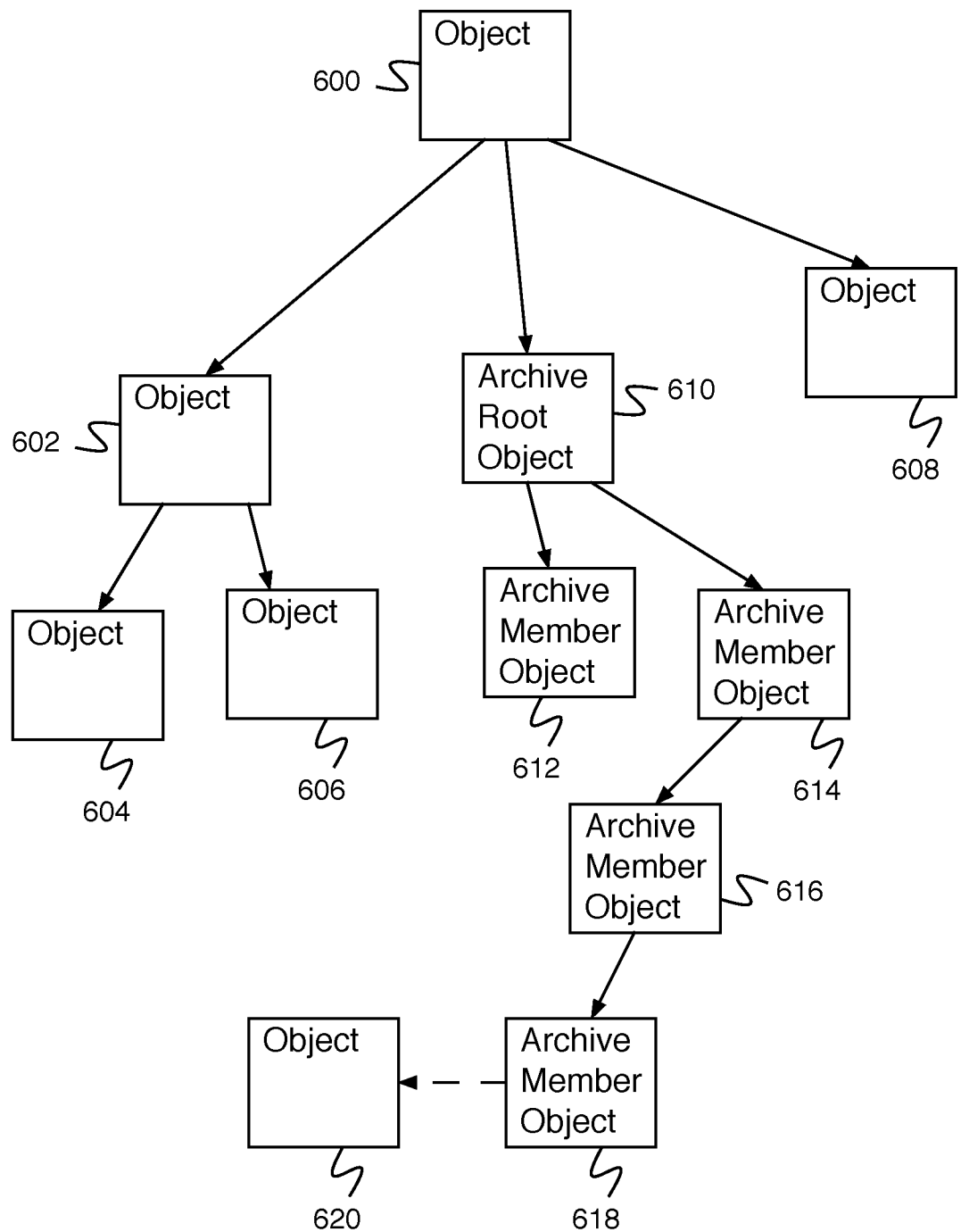
FIG. 6 is a block diagram illustrating an embodiment of an object tree.

FIG. 6 is a block diagram illustrating an embodiment of an object tree. In some embodiments, the object tree of FIG. 6 comprises an object tree stored in object tree data storage 202 of FIG. 2. In the example shown, object 600 comprises a top-level object. In some embodiments, an object tree comprises only one top-level object (e.g., a company or organization object). Object 602, object 604, and object 606 comprise a subtree of top-level object 600. Object 600 has a direct relation to object 602 and indirect relations to object 604 and object 606. Object 608 comprises a single object subtree of top-level object 600. Archive root object 610 comprises the top-level object of a subtree of object 610. Archive root object 610 is associated with archive root metadata. In some embodiments, archive root object 610 associated with archive root metadata indicates that the subtree that archive root object 610 is at the top level of comprises an archive subtree. In some embodiments, all objects descending archive root object 610 are required to be associated with archive member metadata, and the tree of archive objects headed by archive root object 610 are all archived together. In some embodiments, archive members are based on the ownership structure for example, in the event that an object is owned by an archivable root instance, it is an archive member. So, once a root is associated with archive root (e.g., archive root object 610), all objects traversable through the ownership structure (e.g., connected through owns/owned by relationships) are archivable members and will be archived together. In some embodiments, an archive root object represents an individually removable set of elements of the database system (e.g., a payroll result, a performance review, etc.), and the member objects in the tree associated with the archive root object represent constituent parts of the set of elements of the database system that should all be removed together. In the example shown, archive member object 612 and archive member object 614 have direct relations from archive root object 610 (e.g., there is a relation from archive root object 610 to archive member object 612 and from archive root object 610 to archive member object 614). Archive member object 616 and archive member object 618 have indirect relations from archive root object 610 (e.g., there is a relation from archive root object 610 to archive member object 616 with intervening object archive member object 614, and there is a relation from archive root object 610 to archive member object 618 with intervening objects archive member object 614 and archive member object 616). Archive member object 610 is connected to object 620 (e.g., an object that is not associated with archive root metadata or archive member metadata) via a relation. In some embodiments, in archiving relationships are not disconnected.

Figure 7:
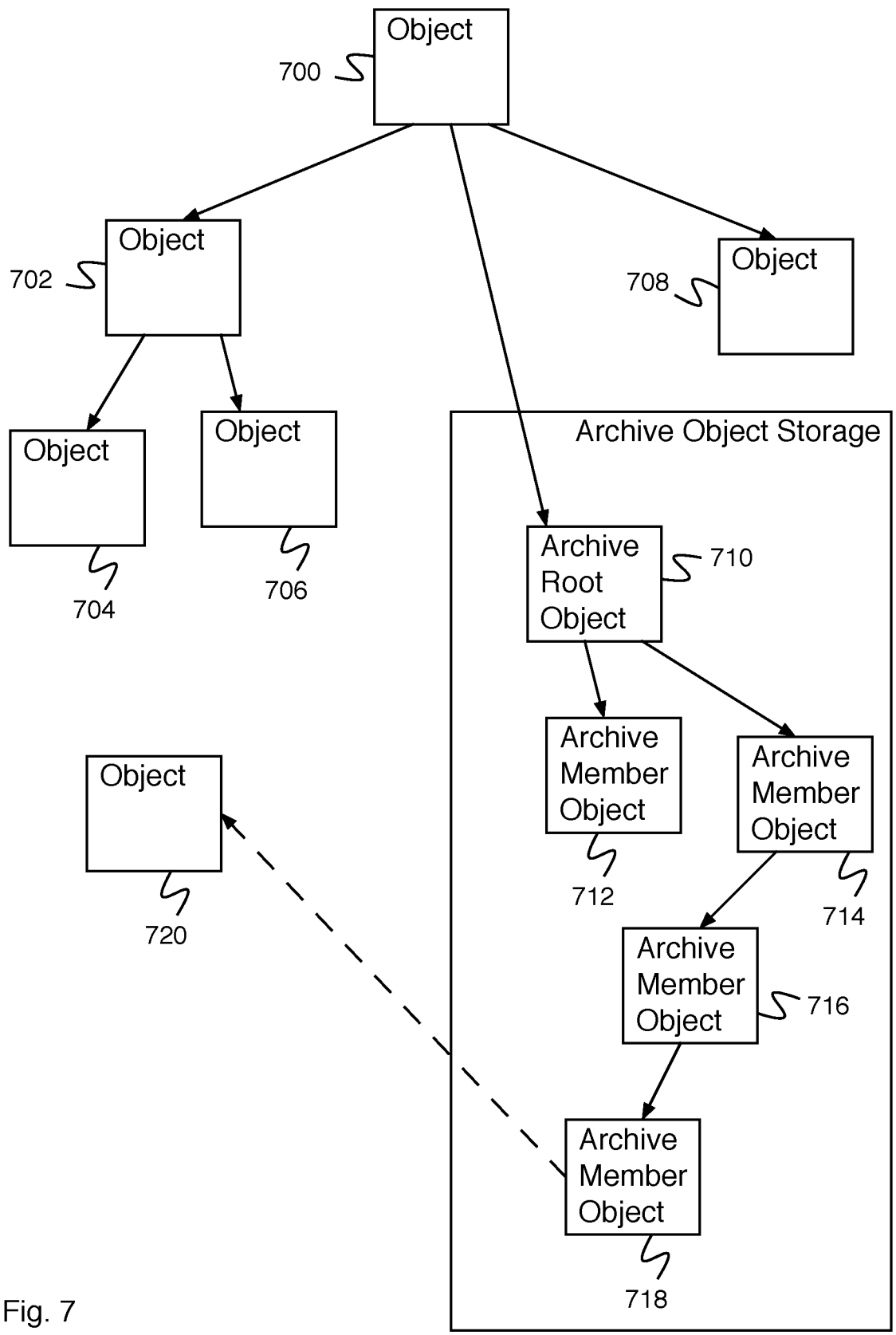
FIG. 7 is a block diagram illustrating an embodiment of an object tree with an archived subtree.

FIG. 7 is a block diagram illustrating an embodiment of an object tree with an archived subtree. In some embodiments, the object tree of FIG. 7 comprises the object tree of FIG. 6 with the archivable subtree having been archived. In the example shown, object 700 comprises a top-level object with a subtree comprising object 702, object 704, and object 708, and a subtree comprising object 708. Object 700 additionally comprises an archived subtree. The archived subtree comprises archive root object 710, archive member object 712, archive member object 714, archive member object 716, and archive member object 718. In the example shown, archive root object 710, archive member object 712, archive member object 714, archive member object 716, and archive member object 718 are archived (e.g., they are stored in an archive object storage). In the example shown, the relation from object 700 to archived archive root object 710 is preserved (e.g., still exists and can still be followed). In some embodiments, following the relation from object 700 to archived archive root object 710 requires a special permission (e.g., some users, e.g., a typical user is not allowed to follow the relation). In the example shown, the relation, is not an owns relation, from archived archive member object 718 to object 720 is preserved. In some embodiments, the relation from archived archive member object 718 to object 720 is ignored.

FIG. 8 is a diagram illustrating an embodiment of an object data table. In some embodiments, object data table 800 comprises data describing each of a set of objects (e.g., each object of the object tree of FIG. 4). In the example shown, each object is associated with an object identifier. The object identifier links the information stored associated with the object in object data table 800 with a corresponding object in an object tree. In some embodiments, the identifier comprises a hashed unique identifier (e.g., "DA5B", "EA79", etc.). In some embodiments, the identifier comprises an object type identifier (e.g., a number indicating the object type) and an object count identifier (e.g., a number indicating which instance of the type the object is). In the example shown, each object in object data table 800 comprises a set of attribute bits describing the object. In some embodiments, attribute bits indicate whether or not the object is in a particular state. In various embodiments, attribute bits indicate whether the object is operational, archive prepared, archive simulated, archived, indicated for deletion, visible, readable, modifiable, or any other appropriate object states. In the example shown, each object in object data table 800 is associated with a data blob. The data blob comprises binary data associated with the object. In some embodiments, object data table 800 comprises an identifier associated with the data blob for identifying the data blob associated with an object (e.g., object with identifier "DA5B" is associated with the data blob with identifier "<DA5B>"). In some embodiments, a data blob comprises a compressed data blob. In some embodiments, a data blob comprises an encrypted data blob. In some embodiments, a data blob comprises an effective change stack (e.g., an ordered set of effective change objects describing changes that have been applied to the associated object).

Figure 9:
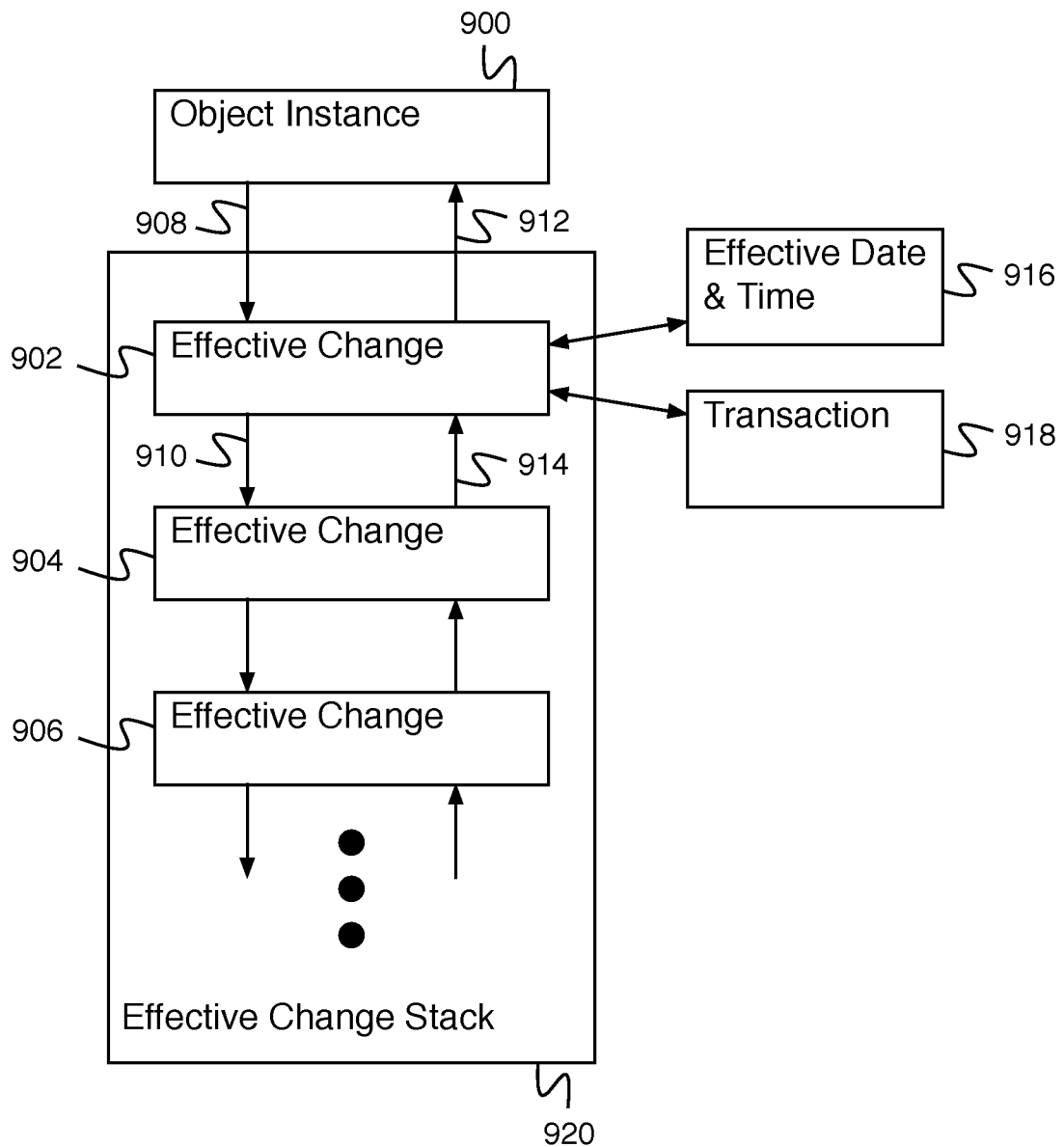
FIG. 9 is a block diagram illustrating an embodiment of an effective change stack.

FIG. 9 is a block diagram illustrating an embodiment of an effective change stack. In some embodiments, effective change stack 920 records the state of an object through time. In the example shown, object instance 900 has relationships 908 and 912 with effective change 902 (e.g., the effective change object at the top of effective change stack 920). Relationship 908 refers to the latest effective change for object instance 900. Relationship 912 refers to object instance 900 having effective changes as described, for example, by effective change 902. Effective change stack 920 comprises a plurality of linked effective change objects (e.g., effective change 902, effective change 904, effective change 906, etc.) Each effective change object is linked to an older effective change object (e.g., by a older change object relationship, e.g., relationship 910) and to a newer effective change object (e.g., by a newer effective change object relationship, e.g., relationship 914). In some embodiments, the older effective change object relationship from the oldest effective change object in effective change stack 920 points to nil, and the newer effective change object relationship from the newest effective change object in effective change stack 920 points to object instance 920. Each effective change object of effective change stack 920 comprises a relation to an effective date & time object (e.g., effective date & time object 916) and a transaction object (e.g., transaction object 918). In some embodiments, an effective date & time object comprises an effective date and time associated with an object transaction. In some embodiments, a transaction object comprises information describing an object transaction (e.g., a change made to an object). In some embodiments, effective change stack 920 comprises the set of all transactions made to object instance 900. In some embodiments, effective change stack 920 can be used to determine the state of object instance 900 at any point in time. In some embodiments, effective change stack 920 is stored compressed. In some embodiments, effective change stack 920 is stored encrypted. In some embodiments, effective change stack 920 comprises a data blob (e.g., a data blob associated with an object in an object data table, e.g., object data table 800 of FIG. 8).

Figure 10:
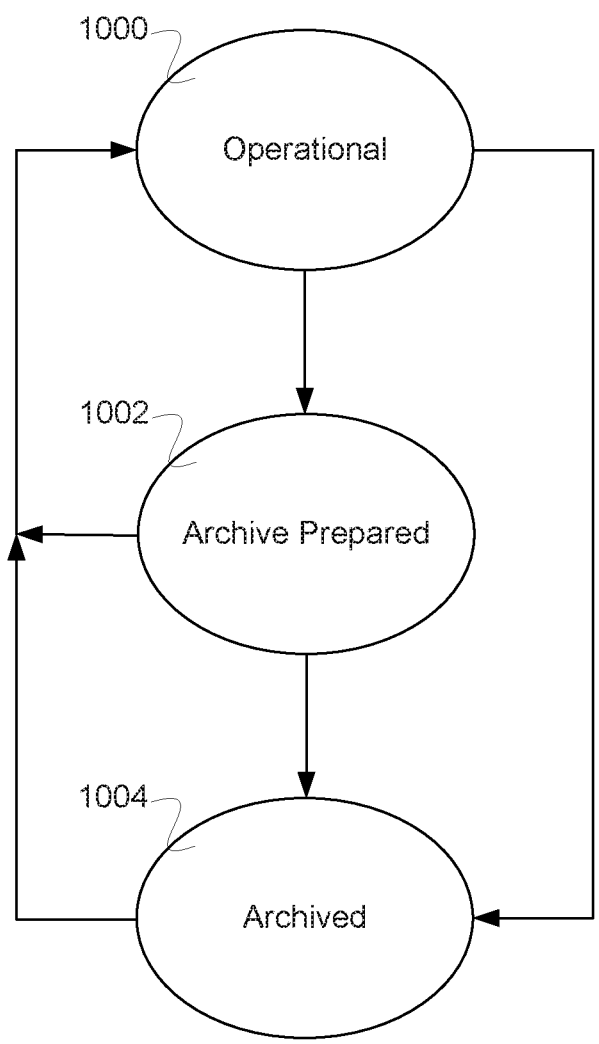
FIG. 10 is a state diagram illustrating an embodiment of object state transitions.

FIG. 10 is a state diagram illustrating an embodiment of object state transitions. In some embodiments, the state diagram of FIG. 10 illustrates object state transitions of an object in an object tree (e.g., the object tree of FIG. 7). In the example shown, the states of FIG. 10 comprise possible data aging states of an object. Operational state 1000 comprises an operational state, e.g., a default data aging state. An object in operational state is available for normal use. An object in operational state can transition to archive prepared state 1002. Archive prepared state 1002 comprises a state wherein the object is prepared for archiving. In various embodiments, preparing an object for archiving comprises marking relations to the object (e.g., that the object is archived), adding restrictions to access to the object, indicating that the object is prepared for archiving in an object attribute, indicating that the object is prepared for archiving in an object data table, or any other appropriate archive preparation actions.

In some embodiments, archived prepared state 1002 is not included and operational state 1000 has transitions directly to and from archived state 1004.

In some embodiments, preparing an object for archiving comprises all necessary actions for archiving other than actually archiving the object (e.g., deleting the object from working memory). In some embodiments, preparing an object for archiving comprises flagging the object as archive prepared. An object in archive prepared state 1002 can transition to operational state 1000 or to archived state 1004. In some embodiments, an object in archive prepared state 1002 is monitored for access. In various embodiments, in the event a process attempts to access the object in archive prepared state, an error is provided to an administrator, an error is logged, the object is automatically transitioned to operational state 1000, the object is indicated for later transition to operational state 1000, or any other appropriate indication is made. In some embodiments, in the event an object in archive prepared state 1002 transitions to operational state 100, relations are unmarked. In some embodiments, relations are unmarked using an effective change stack. In some embodiments, in the event an object in archive prepared state 1002 transitions to operational state 1000, indications of archive prepared 1002 state are removed. In some embodiments, an object in archive prepared state 1002 transitions to operational state 1000 when indicated to by an administrator. In some embodiments, an object in archive prepared state 1002 transitions to archived state 1004 after a predetermined period of time. In some embodiments, an object in archive prepared state 1002 transitions to archived state 1004 after a predetermined period of time without any attempts to access the object. In various embodiments, the predetermined period of time comprises two weeks, six administrator logins, three software updates, or any other appropriate period of time. Archived state 1004 comprises a state wherein the object is archived. In various embodiments, archiving the object comprises moving the object to an archive memory (e.g., copying the object to an archive memory and deleting it from working memory), indicating that the object is archived in an object attribute, indicating that the object is archived in an object data table, or any other appropriate archiving action. In some embodiments, an object in archived state 1004 is monitored for access. In some embodiments, in the event an attempt to access an object in archived state 1004 is made, the access is only allowed in the event the accessor has permission to access archived objects (e.g., a context is set for a user, a process, etc. allowing access to archived objects). An object in archived state 1004 can transition to operational state 1000. In various embodiments, in the event an object in archived state 1004 transitions to operational state 1000, traversing of relations is reallowed, the object is moved from archive memory to working memory, indications of archived state 1004 are removed, or any other appropriate operational state modifications are made. In some embodiments, an object in archived state 1004 transitions to operational state 1000 when indicated to by an administrator.

Figure 11:
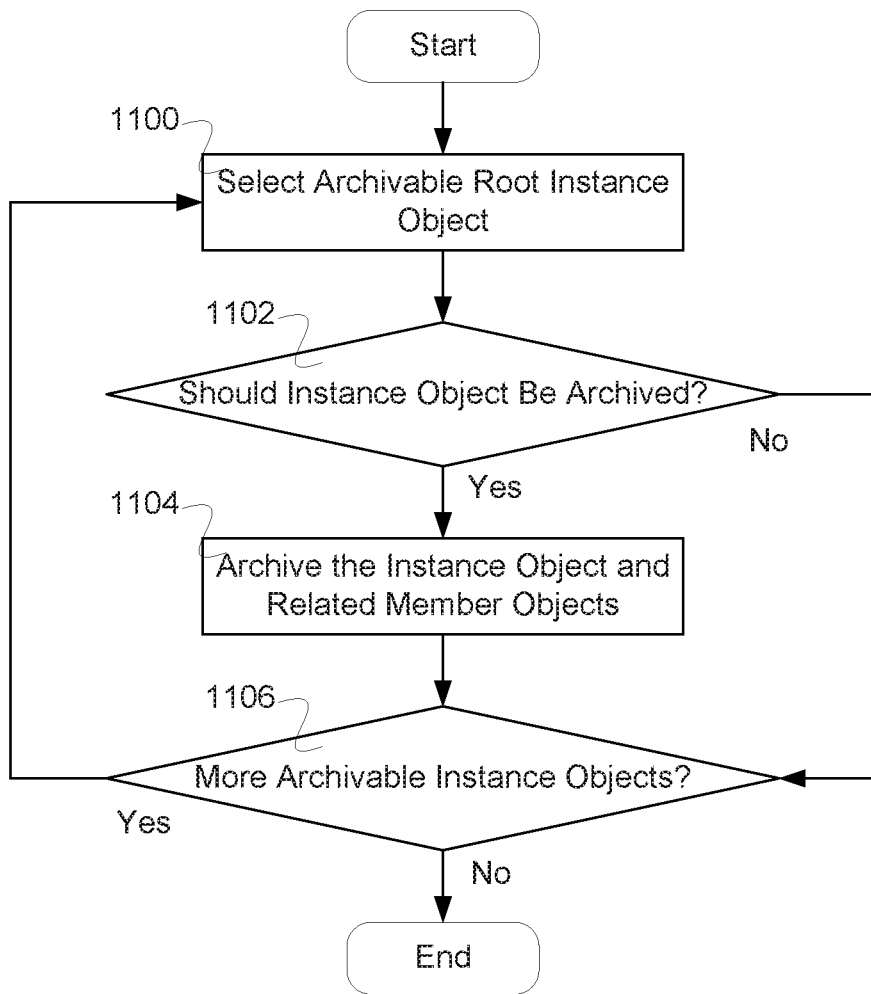
FIG. 11 is a flow diagram illustrating an embodiment of a process for data management.

FIG. 11 is a flow diagram illustrating an embodiment of a process for data management. In some embodiments, the process of FIG. 11 is executed by archive system 300 of FIG. 3. In the example shown, in 1100, the next archivable root instance object is selected. In some embodiments, the next object comprises the first archivable root instance object. In various embodiments, the scanning is initiated according to a predetermined schedule (e.g., every day at midnight, every hour on the hour, etc.), the scanning is manually started, the scanning is initiated after a finalized process (e.g., a finalized payroll process, etc.), or the scanning is initiated at any other appropriate time. In 1102, it is determined whether the instance object should be archived. In some embodiments, it is determined whether the instance object should be archived using an archive determiner (e.g., archive determiner 304 of FIG. 3). In some embodiments, it is determined whether the instance object should be archived using one or more archive rules. In various embodiments, archive rules are based at least in part on object age, object relations to other objects, object associated data, or any other appropriate information. In the event it is determined that the instance object should not be archived, control passes to 1106. In the event it is determined that the object should be archived, control passes to 1104. In 1104, the instance object and related member objects are archived. In 1106, it is determined whether there are more archivable instance objects. In the event it is determined that there are no more archivable instance objects, the process ends. In the event it is determined that there are more archivable instance objects, control passes to 1100. In some embodiments, instructions for the steps of the process of FIG. 11 are stored in a memory and provided for execution by a processor coupled to the memory. In various embodiments, the memory comprises a magnetic memory, a solid-state memory, an optical memory, or any other appropriate memory.

Figure 12:
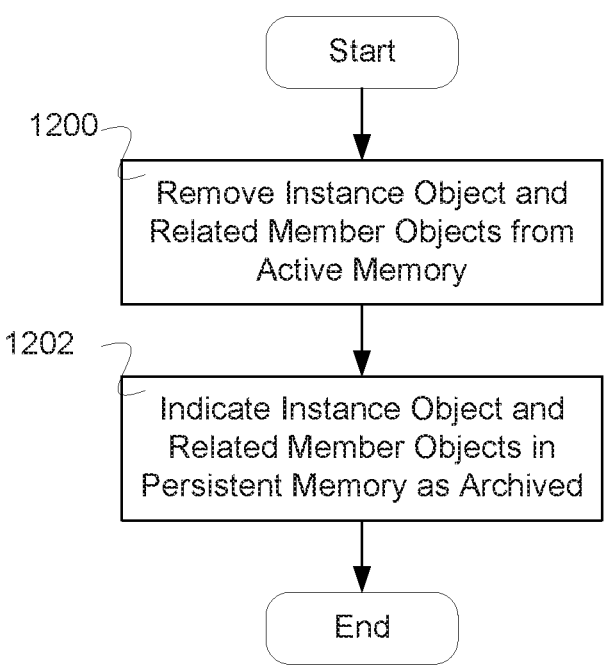
FIG. 12 is a flow diagram illustrating an embodiment of a process for archiving.

FIG. 12 is a flow diagram illustrating an embodiment of a process for archiving. In some embodiments, the process of FIG. 12 is used to implement 1104 of FIG. 11. In the example shown, in 1200, an instance object and related member objects are removed from active memory. In 1202, an instance object and related member objects are indicated as archived in persistent memory.

Figure 13:
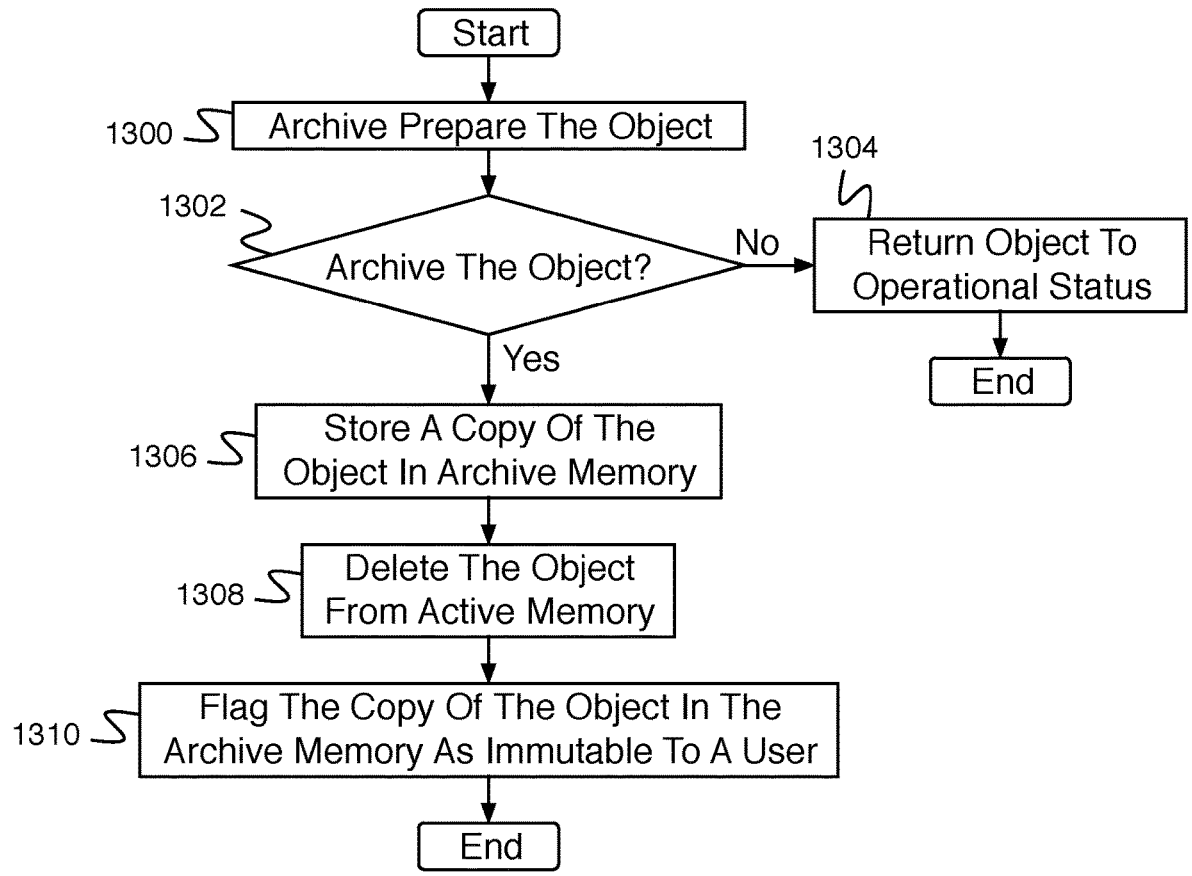
FIG. 13 is a flow diagram illustrating an embodiment of a process for archiving an object.

FIG. 13 is a flow diagram illustrating an embodiment of a process for archiving an object. In some embodiments, the process of FIG. 13 comprises a process for archiving the object in an archive memory, wherein an other object maintains a relation with the object that has been archived. In some embodiments, the process of FIG. 13 implements 1202 of FIG. 12. In the example shown, in 1300, the object is archive prepared. In some embodiments, archive preparing an object comprises flagging the object as archive prepared. In some embodiments, archive preparing an object comprises determining a number of accesses of the object. In some embodiments, the archive object is not prepared for example, step 1300 is omitted. In 1302, it is determined whether to archive the object. In some embodiments, it is determined whether to archive the object based at least in part on a number of accesses of the object. In the event it is determined to archive the object, control passes to 1306. In the event it is determined not to archive the object, control passes to 1304. In 1304, the object is returned to operational status, and the process then ends. In 1306, a copy of the object is stored in an archive memory. In 1308, the object is deleted from active memory. In 1310, the copy of the object in the archive memory is flagged as immutable to a user.

Figure 14:
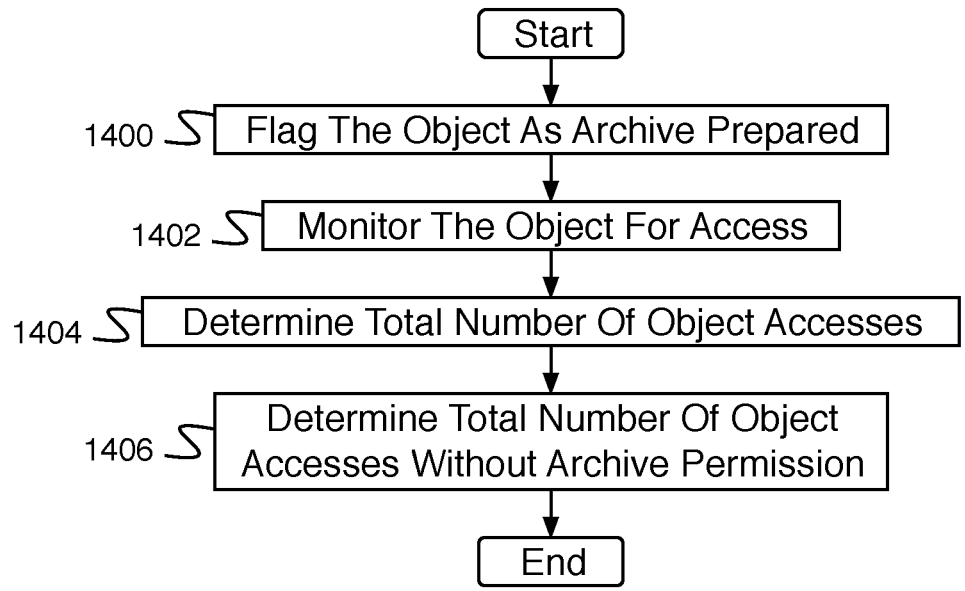
FIG. 14 is a flow diagram illustrating an embodiment of a process for archive preparing an object.

FIG. 14 is a flow diagram illustrating an embodiment of a process for archive preparing an object. In some embodiments, the process of FIG. 14 implements 1300 of FIG. 13. In some embodiments, the process for archive preparing an object tracks access to an archive prepared object prior to determining whether to archive an object. In the example shown, in 1400, the object is flagged as archive prepared. In various embodiments, the object is flagged as archive prepared by setting an object attribute, by setting an attribute bit in an object data table, by making an indication in an archive prepared record, or is flagged in any other appropriate way. In 1402, the object is monitored for access. In some embodiments, the object is monitored for access for a predetermined period of time. In various embodiments, the object is monitored for 1 minute, for 1 hour, for 1 day, for 1 week, or for any other predetermined period of time. In 1404, a total number of object accesses is determined. In some embodiments, the total number of object accesses comprises the total number of object attempts to access the object during 1402. In 1406, a total number of object accesses without archive permission is determined. In some embodiments, archive permission is required to access an archived object. In some embodiments, in the event access to an archive prepared object is attempted without archive permission, access is granted and logged (e.g., a count of the total number of object access without archive permission is incremented). In some embodiments, archive permission is restricted to an archive report process. In some embodiments, archive permission is restricted to a user with archive report process access. In some embodiments, archive permission is restricted to an archive report process and an archive update process.

Figure 15:
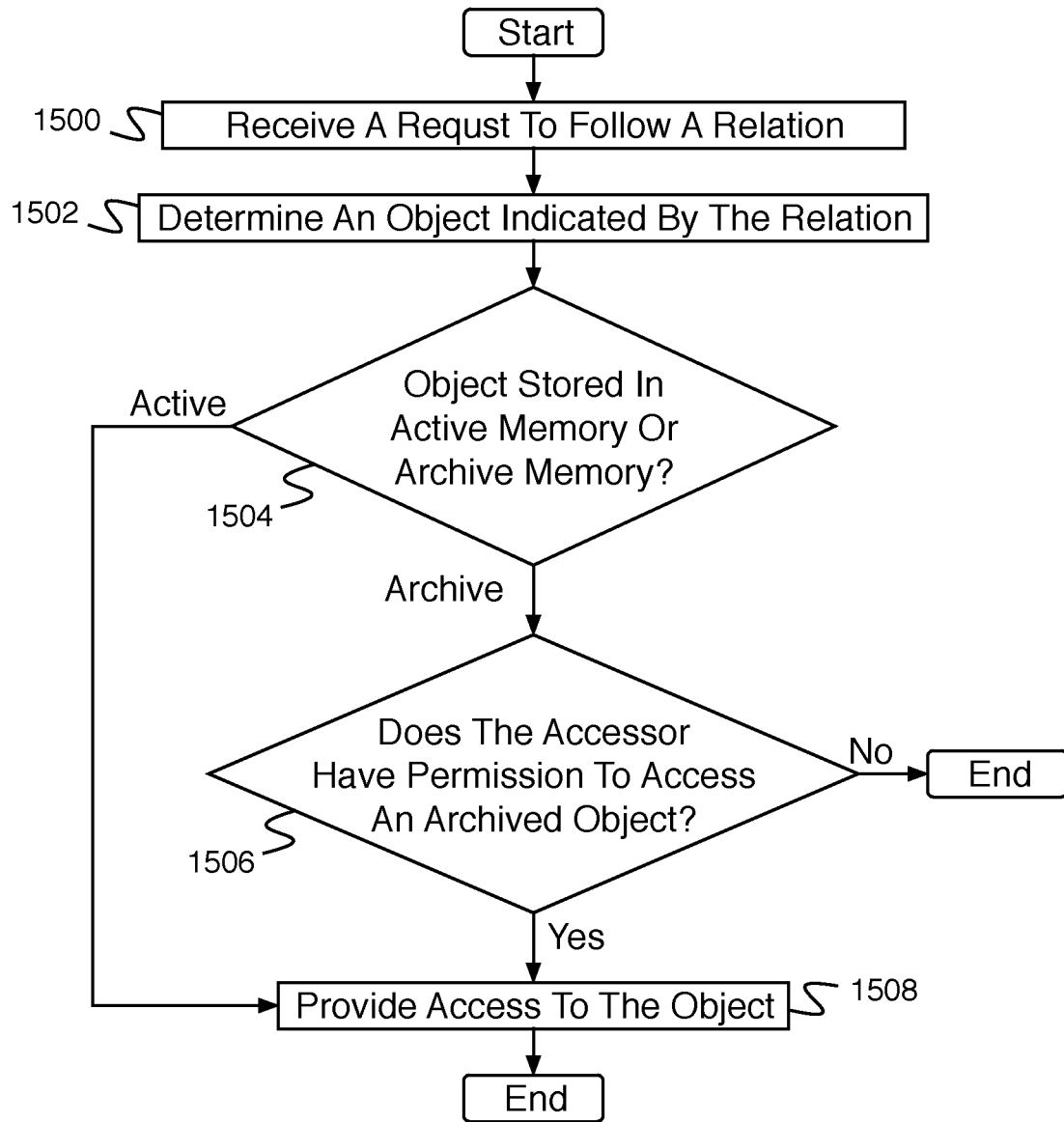
FIG. 15 is a flow diagram illustrating an embodiment of a process for providing access to an archived object indicated by a special context.

FIG. 15 is a flow diagram illustrating an embodiment of a process for providing access to an archived object indicated by a special context. In some embodiments, the process of FIG. 15 is performed by a data storage system (e.g., data storage system 200 of FIG. 2) for providing access to an object stored in an object tree data storage or in an archive data storage. In some embodiments, access to an object is provided for a process for data reporting. In the example shown, in 1500, a request to follow a relation is received. In 1502, an object indicated by the relation is determined. In some embodiments, the relation indicates a unique object identifier (e.g., an object serial number). In 1504, it is determined whether the object is stored in an active memory (e.g., an object tree data storage) or an archive memory (e.g., an archive data storage). In some embodiments, it is determined whether the object is stored in an active memory or an archive memory using an object data table (e.g., object data table 800 of FIG. 8). In the event it is determined that the object is stored in an active memory, control passes to 1508. In the event it is determined that the object is stored in an archive memory, control passes to 1506. In 1506, it is determined whether the accessor has permission to access an archived object. For example, there is a context that indicates the user or the process has permission to access archived objects. In some embodiments, determining whether the accessor has permission to access the archived object comprises determining a set of permissions associated with the accessor and determining whether the set of permissions comprises permission to access an archived object. In some embodiments, determining whether the accessor has permission to access the archived object comprises determining a list of accessors with permission to access archived objects and determining whether the accessor is included in the list of accessors. In some embodiments, determining whether the accessor has permission to access the archived object comprises determining whether the accessor has permission to run an archive accessing report and to access archive data. In the event it is determined that the accessor has permission to access an archived object, control passes to 1508. In the event it is determined that the accessor does not have permission to access an archived object, the process ends. In some embodiments, an indication is provided that access to an archived object was denied. In some embodiments, a denial is not explicitly performed, rather an object is not available and/or visible to the system. In 1508, access to the object is provided.

Figure 16:
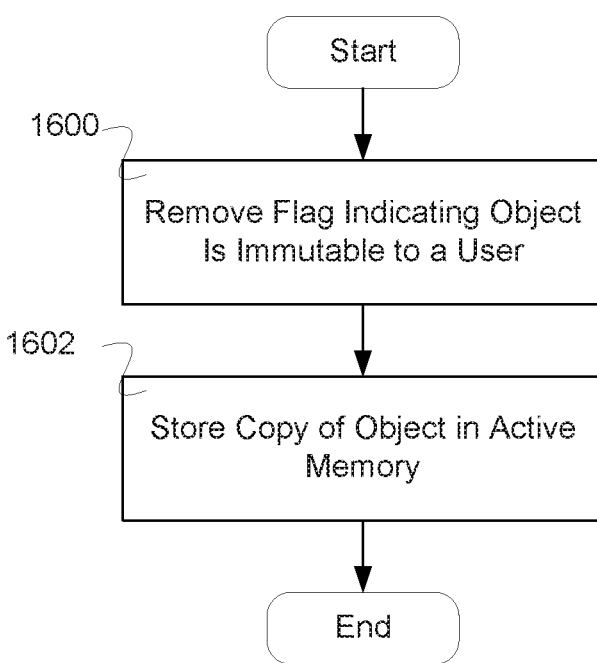
FIG. 16 is a flow diagram illustrating an embodiment of a process for returning an object to operational status.

FIG. 16 is a flow diagram illustrating an embodiment of a process for returning an object to operational status. In some embodiments, the process of FIG. 16 implements 1304 of FIG. 13. In the example shown, in 1600, the flag indicating the object is immutable to a user is removed. In 1602, a copy of the object is stored in active memory. For example, the object is copied from persistent memory to active memory.

Figure 17:
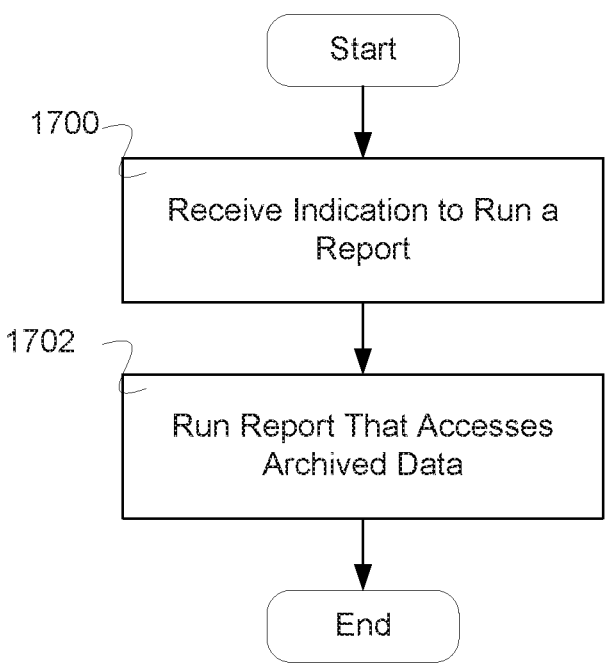
FIG. 17 is a flow diagram illustrating an embodiment of a process for running a report.

FIG. 17 is a flow diagram illustrating an embodiment of a process for running a report. In some embodiments, the process of FIG. 17 is executed by data reporting system 208 of FIG. 2. In the example shown, in 1700, an indication to run a report is received. In 1702, the report is run that accesses archived data. For example, the report is run. In some embodiments, the report accesses active data in the active memory and archive data in the archive memory. In some embodiments, archive data comprises former active data that has been archived. In some embodiments, archive data is accessed using a relation of an active object in the active memory with an archived object in the archive memory. In some embodiments, access to archive data is allowed using a report process that has archive access permission. In some embodiments, access to archive data is allowed using a special context in the event that the user or process has archive report access permission. In various embodiments, the special context is used for the following: special reports, during regular data conversions, during unarchiving, or any other appropriate reason.

In some embodiments, a retention rule is used to determine what objects are archived. For example, using an index on a date field objects, objects are archived after the date. In some embodiments, a selection rule is used to determine what can be retrieved from the archive. For example, a retention rule could state that "retain in memory all performance reviews newer than October of 2014", and a selection rule used in a report could "select data that is newer than October of 2013". This would mean that all performance reviews older than October 2014 would be archived (i.e., not in active memory), but the report using the given selection rule, would be allowed to access instances in the archived memory up to October of 2013.

Figure 18:
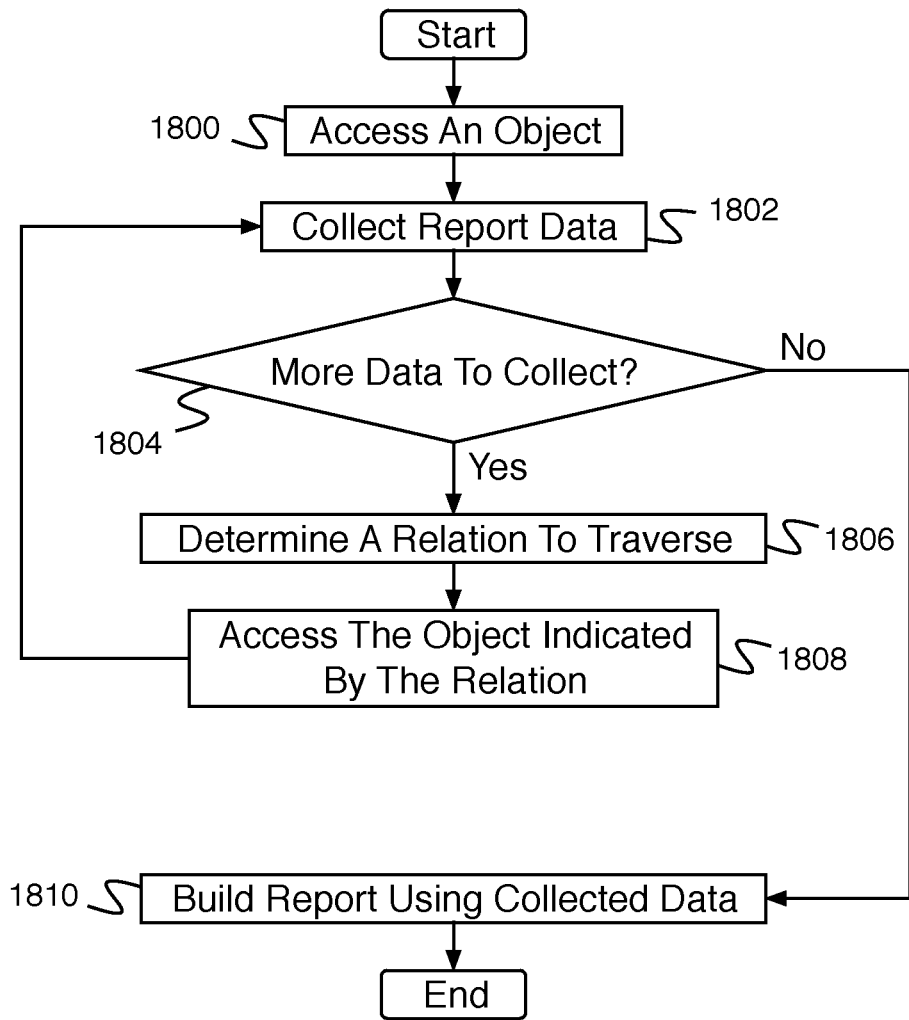
FIG. 18 is a flow diagram illustrating an embodiment of a process for running a report.

FIG. 18 is a flow diagram illustrating an embodiment of a process for running a report. In some embodiments, the process of FIG. 18 implements 1702 of FIG. 17. In the example shown, in 1800, an object is accessed. In some embodiments, the object comprises a starting object for the report. In 1802, report data is collected. In 1804, it is determined whether there is more data to collect. In the event it is determined that there is not more data to collect, control passes to 1810. In the event it is determined that there is more data to collect, control passes to 1806. In 1806, a relation to traverse is determined. In some embodiments, the relation comprises a relation from the last object accessed. In 1808, the object indicated by the relation is accessed. In some embodiments, the process for providing access to the object comprises the process of FIG. 15. Control then passes to 1802. In 1810, a report is built using collected data. In various embodiments, building the report comprises formatting data, processing data, filtering data, analyzing data, determining conclusions and/or action items from data, or any other appropriate report building action.

Figure 19:
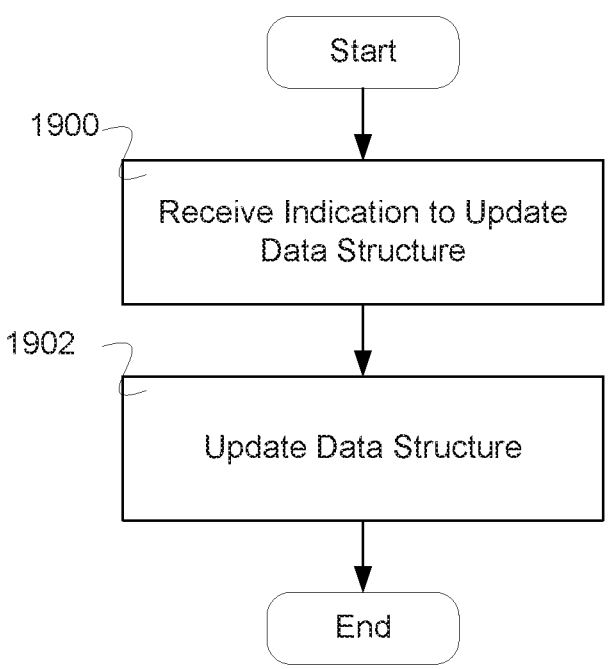
FIG. 19 is a flow diagram illustrating an embodiment of a process for updating data.

FIG. 19 is a flow diagram illustrating an embodiment of a process for updating data. In some embodiments, the process of FIG. 19 is executed by data updating system 210 of FIG. 2. In the example shown, in 1900, an indication to update data structure is received. In 1902, data structure is updated. For example, objects are updated in the system including objects that are indicated as archived. In some embodiments, an archive data structure in the archive memory is updated, wherein the archive data comprises former active data that has been archived. In some embodiments, archive data is accessed using a relation of an active object in the active memory (e.g., a class object in active memory) with an archived object in the archive memory (e.g., an archived instance of an object). In some embodiments, accessing using a relation for updating requires that the process has the same special context that grants archive access permission. In some embodiments, the updating maintains the object (e.g., updates to attributes, methods, relations, etc.) that are updated for the class of objects. In some embodiments, this enables the object to be accessed in the same way as an active object (e.g., making access methods uniform and efficient for the computer system). In some embodiments, unarchiving the object enables the return of the archived object to active status and the update capability while the object is indicated as archived enables efficient unarchiving (e.g., without having to apply updates at the time of unarchiving).

Figure 20:
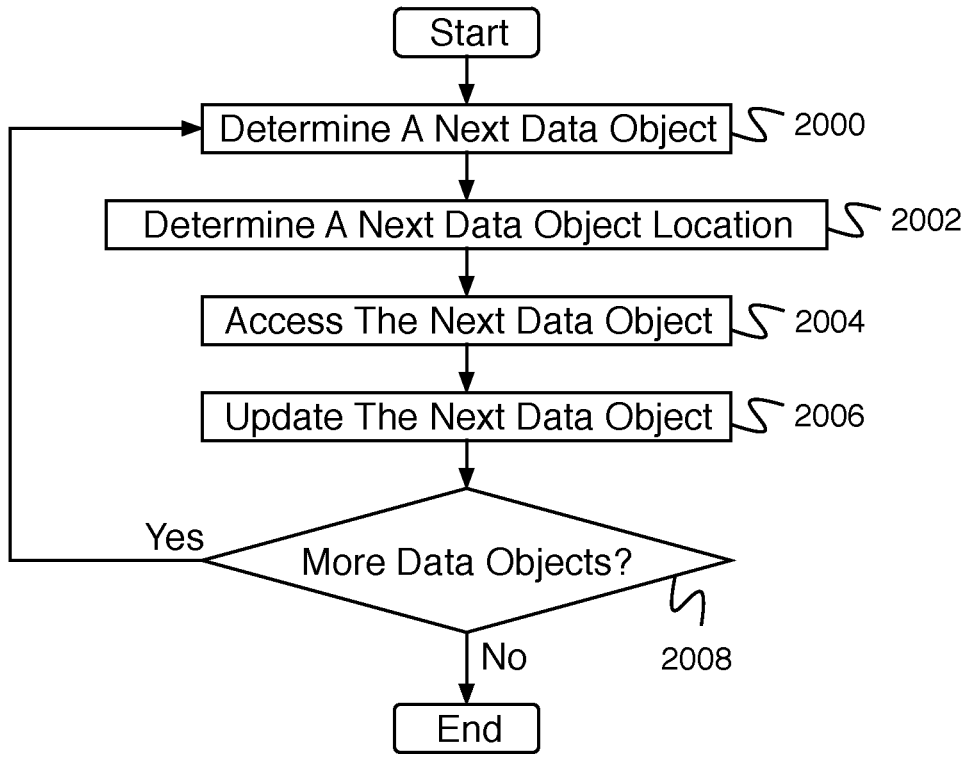
FIG. 20 is a flow diagram illustrating an embodiment of a process for updating data objects in a memory.

FIG. 20 is a flow diagram illustrating an embodiment of a process for updating data objects in a memory. In some embodiments, the process of FIG. 20 is used to implement 1902 of FIG. 19. In some embodiments, the memory comprises an object tree data storage. In some embodiments, the memory comprises an archive data storage. In the example shown, in 2000, a next data object is determined. In some embodiments, the next data object comprises the first data object. In 2002, a next data object location is determined. In some embodiments, the next data object location comprises a location in an object tree data storage. In some embodiments, the next data object location comprises a location in an archive data storage. In 2004, the next data object is accessed. For example, a next data object comprises a data object in active memory, in persistent memory, in persistent memory with an indication that the object is archived, in persistent memory without an indication that the object is archived, or any other appropriate object. In some embodiments, access of the next data object requires that the process for updating has permission to access archived objects. In 2006, the next data object is updated. In some embodiments, the next data object is updated using the process of FIG. 19. In various embodiments, updating the next data object comprises adding, removing, or modifying data object methods, adding, removing, or modifying data object attributes, adding, removing, or modifying data object relations, or updating the next data object in any other appropriate way. In 2008, it is determined whether there are more data objects (e.g., more data objects in the object tree data storage, more data objects in the archive data storage, etc.). In the event it is determined that there are more data objects, control passes to 2000. In the event it is determined that there are not more data objects, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for archiving, comprising:
an active memory;
an archive memory;
an interface configured to:
receive an indication to archive an object in the active memory, wherein an object tree is comprised of a plurality of objects, wherein the plurality of objects of the object tree are stored in the active memory, wherein a subtree of the object tree comprises the object and a subset of the plurality of objects, wherein the object has a relation to an other object in the active memory, wherein the object tree comprises the other object and the subtree does not comprise the other object, wherein the object is an root object of the subtree and the subset of the plurality of objects include one or more member objects of the subtree; and
a processor configured to:
in response to receiving the indication to archive the object prepare the object to be archived, wherein to prepare the object to be archived, the processor is configured to:
flag the object as archive prepared by setting an attribute bit associated with the object in an object data table;
monitor the object for accesses, comprising determining a number of object accesses associated with the object; and
determine a number of object accesses associated with the object that do not have archive permission;
archive in the archive memory the object and the subset of the plurality of objects based on the determined number of object access associated with the object and the determined number of object accesses associated with the object that do not have archive permission; and maintain the relation between the other object stored in the active memory and the archived object stored in the archive memory, wherein to maintain the relation between the other object stored in the active memory and the archived object stored in the archive memory, the processor is configured to enable the archived object stored in the archive memory to be accessed from the other object stored in the active memory by traversing the object tree stored in the active memory from the other object to the archived object stored in the archive memory.

2. The system of claim 1, wherein the active memory comprises a DRAM.

3. The system of claim 1, wherein an active database system is stored in the active memory.

4. The system of claim 1, wherein an object database is stored at least in part in the active memory.

5. The system of claim 1, wherein the archive memory comprises a disk.

6. The system of claim 1, wherein the object is stored in an object database.

7. The system of claim 1, wherein the object comprises attributes.

8. The system of claim 1, wherein the object comprises methods.

9. The system of claim 1, wherein the object comprises relations.

10. The system of claim 1, wherein to maintain the relation, the processor is configured to maintain an ability of a user or a process to follow the relation.

11. The system of claim 10, wherein a permission is required for the user or the process to follow the relation.

12. The system of claim 10, wherein following the relation comprises accessing the object.

13. The system of claim 1, wherein to archive the object, the processor is configured to store the object in the archive memory.

14. The system of claim 1, wherein to archive the object, the processor is configured to delete the object from the active memory.

15. The system of claim 1, wherein to archive the object, the processor is configured to flag the object as immutable to a user.

16. The system of claim 1, wherein the processor is further configured to unarchive an archived object.

17. The system of claim 16, wherein to unarchive the archived object, the processor is configured to restore the object to the active memory.

18. A method for archiving, comprising:
receiving an indication to archive an object in an active memory, wherein an object tree is comprised of a plurality of objects wherein the plurality of objects of the object tree are stored in the active memory, wherein a subtree of the object tree comprises the object and a subset of the plurality of objects, wherein the object has a relation to an other object in the active memory, wherein the object tree comprises the other object and the subtree does not comprise the other object, wherein the object is an root object of the subtree and the subset of the plurality of objects include one or more member objects of the subtree;
in response to receiving the indication to archive the object preparing the object to be archived, wherein preparing the object to be archived comprises:
flagging the object as archive prepared by setting an attribute bit associated with the object in an object data table;
monitoring the object for accesses, comprising determining a number of object accesses associated with the object; and
determining a number of object accesses associated with the object that do not have archive permission;
archiving in an archive memory, using a processor, the object and the subset of the plurality of objects based on the determined number of object access associated with the object and the determined number of object accesses associated with the object that do not have archive permission; and
maintaining the relation between the other object stored in the active memory and the archived object stored in the archive memory, wherein maintaining the relation between the other object stored in the active memory and the archived object stored in the archive memory comprises enabling the archived object stored in the archive memory to be accessed from the other object stored in the active memory by traversing the object tree stored in the active memory from the other object to the archived object stored in the archive memory.

19. A computer program product for archiving, the computer program product being embodied in a non-transitory computer readable storage medium and comprising computer instructions for:
receiving an indication to archive an object in an active memory, wherein an object tree is comprised of a plurality of objects wherein the plurality of objects of the object tree are stored in the active memory, wherein a subtree of the object tree comprises the object and a subset of the plurality of objects, wherein the object has a relation to an other object in the active memory, wherein the object tree comprises the other object and the subtree does not comprise the other object, wherein the object is an root object of the subtree and the subset of the plurality of objects include one or more member objects of the subtree;
in response to receiving the indication to archive the object preparing the object to be archived, wherein preparing the object to be archived comprises:
flagging the object as archive prepared by setting an attribute bit associated with the object in an object data table;
monitoring the object for accesses, comprising determining a number of object accesses associated with the object; and
determining a number of object accesses associated with the object that do not have archive permission;
archiving in an archive memory the object and the subset of the plurality of objects based on the determined number of object access associated with the object and the determined number of object accesses associated with the object that do not have archive permission; and
maintaining the relation between the other object stored in the active memory and the archived object stored in the archive memory, wherein maintaining the relation between the other object stored in the active memory and the archived object stored in the archive memory comprises enabling the archived object stored in the archive memory to be accessed from the other object stored in the active memory by traversing the object tree stored in the active memory from the other object to the archived object stored in the archive memory.

20. The system of claim 1, wherein the processor is further configured to: in response to an exceeding determination that the number of object accesses exceeds a threshold within a predetermined period of time, unflag the object as archive prepared.

21. The system of claim 1, wherein the number of object accesses comprises a count of attempts to access the object.

22. The system of claim 1, wherein the number of object accesses comprises a count of object accesses without archive permission.

* * * * *

UNITED STATES PATENT AND TRADEMARK OFFICE
CERTIFICATE OF CORRECTION

PATENT NO. : 10,713,226 B1
APPLICATION NO. : 14/970384
DATED : July 14, 2020
INVENTOR(S) : Seamus Donohue et al.

Page 1 of 1

It is certified that error appears in the above-identified patent and that said Letters Patent is hereby corrected as shown below:

In the Specification

In Column 5, Line(s) 34, before "archive", delete "a" and insert --an--, therefor.
In Column 8, Line(s) 60, before "older", delete "a" and insert --an--, therefor.

Signed and Sealed this
Eighth Day of December, 2020

Andrei Iancu
*Director of the United States Patent and Trademark Office*